US010936718B2

(12) United States Patent
Boulton

(10) Patent No.: US 10,936,718 B2
(45) Date of Patent: Mar. 2, 2021

(54) DETECTING SECURITY RISKS IN BINARY SOFTWARE CODE

(71) Applicant: BlackBerry Limited, Waterloo (CA)

(72) Inventor: Adam John Boulton, Wirral (GB)

(73) Assignee: BlackBerry Limited, Waterloo (CA)

( * ) Notice: Subject to any disclaimer, the term of this patent is extended or adjusted under 35 U.S.C. 154(b) by 187 days.

(21) Appl. No.: 16/148,692

(22) Filed: Oct. 1, 2018

(65) Prior Publication Data

US 2020/0104491 A1 Apr. 2, 2020

(51) Int. Cl.
*G06F 21/00* (2013.01)
*G06F 21/56* (2013.01)
*G06F 21/57* (2013.01)

(52) U.S. Cl.
CPC .......... *G06F 21/563* (2013.01); *G06F 21/577* (2013.01); *G06F 2221/033* (2013.01)

(58) Field of Classification Search
CPC ................ G06F 21/563; G06F 21/577; G06F 2221/033; G06F 21/51; G06F 21/562; G06F 21/14; G06F 8/52; G06F 8/41; G06F 21/52; G06F 21/54; G06F 8/30; G06F 9/45504; G06F 11/3604; G06F 11/3612; G06F 9/45516; G06F 8/71; G06F 9/30076; G06F 8/65; G06F 9/30174; G06F 8/53; G06F 21/126; G06F 21/57; G06F 8/447; G06F 21/56; G06F 21/566

See application file for complete search history.

(56) References Cited

U.S. PATENT DOCUMENTS

| | | | |
|---|---|---|---|
| 8,479,161 B2 | 7/2013 | Weigert | |
| 8,732,825 B2* | 5/2014 | Park | G06F 21/562 726/22 |
| 9,329,846 B1* | 5/2016 | August | G06F 9/45525 |
| 9,798,884 B1* | 10/2017 | Bishop, III | G06F 21/566 |
| 9,817,974 B1* | 11/2017 | Huang | G06F 21/566 |
| 9,973,531 B1 | 5/2018 | Thioux | |
| 10,162,966 B1* | 12/2018 | Huang | G06F 21/566 |
| 2004/0010703 A1 | 1/2004 | Kouznetsov et al. | |
| 2010/0125913 A1* | 5/2010 | Davenport | H04L 63/1466 726/25 |
| 2010/0235913 A1 | 9/2010 | Craioveanu et al. | |
| 2012/0072968 A1 | 3/2012 | Wysopal et al. | |
| 2012/0144486 A1* | 6/2012 | Navaraj | H04L 63/1466 726/23 |

(Continued)

OTHER PUBLICATIONS

PCT International Search Report and Written Opinion in International Application No. PCT/EP2019/076,328, dated Dec. 20, 2019, 16 pages.

*Primary Examiner* — David Garcia Cervetti
(74) *Attorney, Agent, or Firm* — Fish & Richardson P.C.

(57) ABSTRACT

Systems, methods, and software can be used to detect security risks in binary software code. In some aspects, a computer-implemented method comprises: receiving, at an electronic device, a set of binary software code to be loaded onto the electronic device; disassembling, by the electronic device, the set of binary software code into a set of assembly code; determining, by the electronic device, a number of occurrences of an assembly instruction in the set of assembly code; and determining, by the electronic device, whether the set of binary software code has a security risk based on the number of occurrences of the assembly instruction.

15 Claims, 3 Drawing Sheets

(56) References Cited

U.S. PATENT DOCUMENTS

| | | | |
|---|---|---|---|
| 2013/0097659 A1* | 4/2013 | Das | H04W 12/08 |
| | | | 726/1 |
| 2014/0090077 A1* | 3/2014 | Jeong | G06F 21/60 |
| | | | 726/26 |
| 2014/0282908 A1* | 9/2014 | Ward | H04W 12/0027 |
| | | | 726/4 |
| 2015/0377961 A1* | 12/2015 | Lin | G06F 11/263 |
| | | | 714/724 |
| 2016/0094564 A1* | 3/2016 | Mohandas | H04L 63/145 |
| | | | 726/24 |
| 2016/0147517 A1* | 5/2016 | Vicovan | G06F 11/3636 |
| | | | 717/140 |
| 2016/0219438 A1* | 7/2016 | Ward | H04W 12/08 |
| 2019/0243964 A1* | 8/2019 | Shukla | G06F 21/54 |
| 2020/0115979 A1* | 4/2020 | Mickey | E21B 33/128 |

* cited by examiner

DETECTING SECURITY RISKS IN BINARY SOFTWARE CODE

TECHNICAL FIELD

The present disclosure relates to detecting security risks in binary software code.

BACKGROUND

In some cases, software services can be provided by executable binary software code. The binary software code is computer software in a binary format. The computer software can be an application software, a system software (e.g., an operating system or a device driver), or a component thereof. The binary software code can also be referred to as binary program code, executable code, or object code.

DESCRIPTION OF DRAWINGS

Like reference numbers and designations in the various drawings indicate like elements.

DETAILED DESCRIPTION

An electronic device can receive a set of binary software code to be installed and executed on the electronic device. The set of binary software code can be the binary software code of a software program, a portion of a software program, or multiple software programs. In some cases, the set of binary software code can contain security risks. Security risks can include malicious software code that would harm the user's devices, expose the user's information, or a combination thereof. Security risks can also include software code that is vulnerable to malicious attacks.

In some cases, the set of binary software code can be received in a sideloading operation. A sideloading operation refers to receiving software from sources that are not managed by a supplier of the electronic device or an operation system of the electronic device. For example, the set of binary software code can be sideloaded onto the electronic device through file transfer from a Universal Serial Bus (USB) connected drive, a memory storage device such as a memory card or disk, a Bluetooth connected device, or a WiFi connected device. The set of binary software code can also be sideloaded onto the electronic device by downloading from web sites other than an app store of the operating system of the electronic device. In some cases, the sideloaded software code can be in packaged in an Android PacKage (APK) format or an iPhone Application (IPA) format.

Because sideloaded software code is not received from trusted sources such as an app store, they may contain higher security risks than software code that is downloaded through an app store. For example, the binary software code of the sideloaded software may be modified by a malicious attacker to alter the functionalities of the software. For example, the binary software code can be patched to circumvent licensing functionalities by inserting junk routines or no-op (NOP) instructions. These modified binary software code can pose security risks to the electronic device if they are installed and executed on the electronic device.

In some implementations, the electronic device can determine whether a set of binary software code has a security risk based on a frequency and pattern analysis of one or more assembly instructions. The number of occurrences of these assembly instructions and the locations of these assembly instructions can indicate that the set of binary software code has been modified in its binary format, and therefore has a security risk. The electronic device can output a notification indicating the security risk and prevent the modified binary software code from being installed on the electronic device. FIGS. 1-4 and associated descriptions provide additional details of these implementations.

Figure 1:
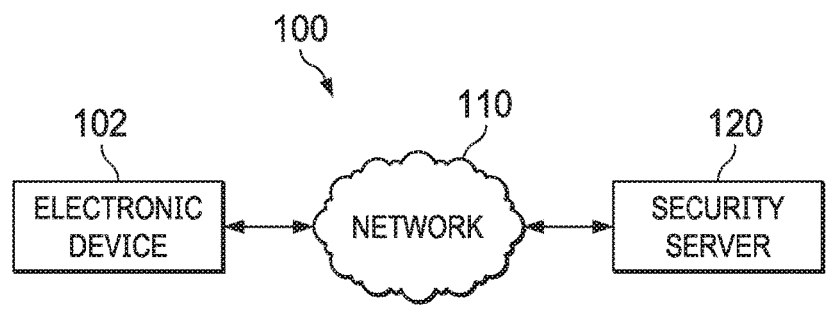
FIG. 1 is a schematic diagram showing an example communication system that detects security risks in binary software code, according to an implementation.

FIG. 1 is a schematic diagram showing an example communication system 100 that detects security risks in binary software code, according to an implementation. At a high level, the example communication system 100 includes an electronic device 102 and a security server 120 that are communicatively coupled with a network 110.

Figure 2:
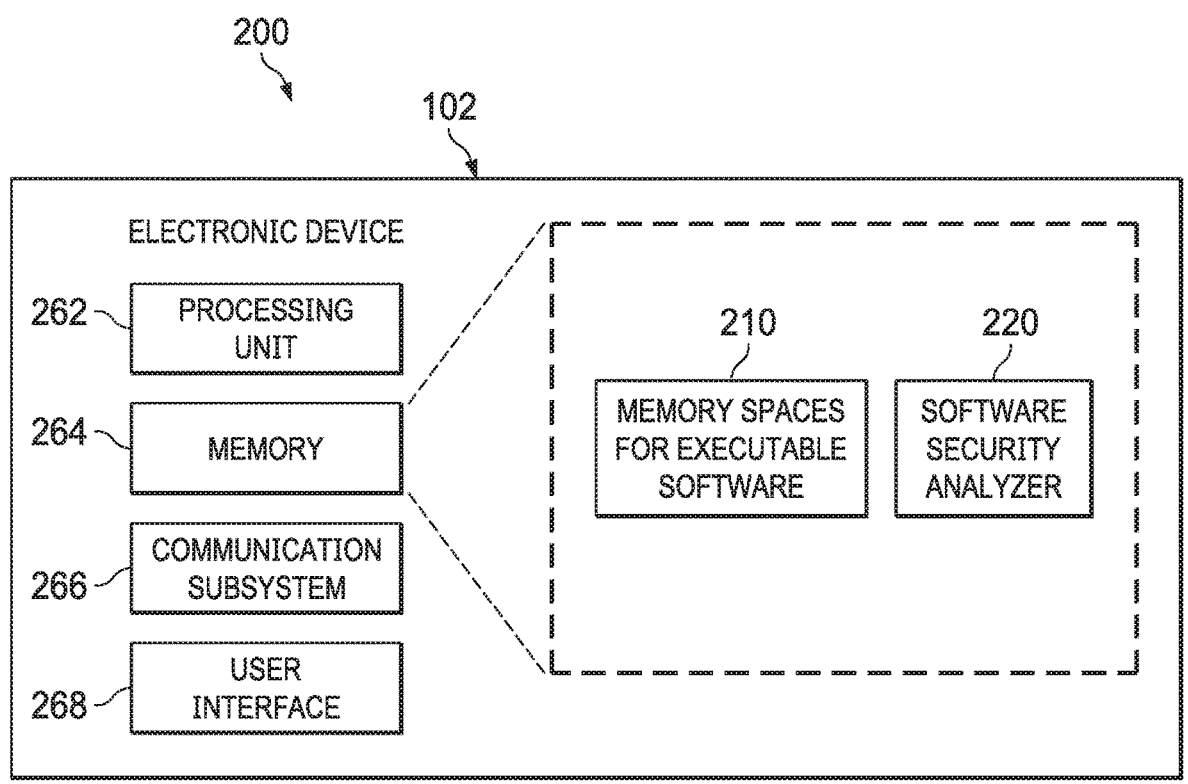
FIG. 2 is a schematic diagram showing an example electronic device 102 that detects security risks in binary software code, according to an implementation.
Figure 3:
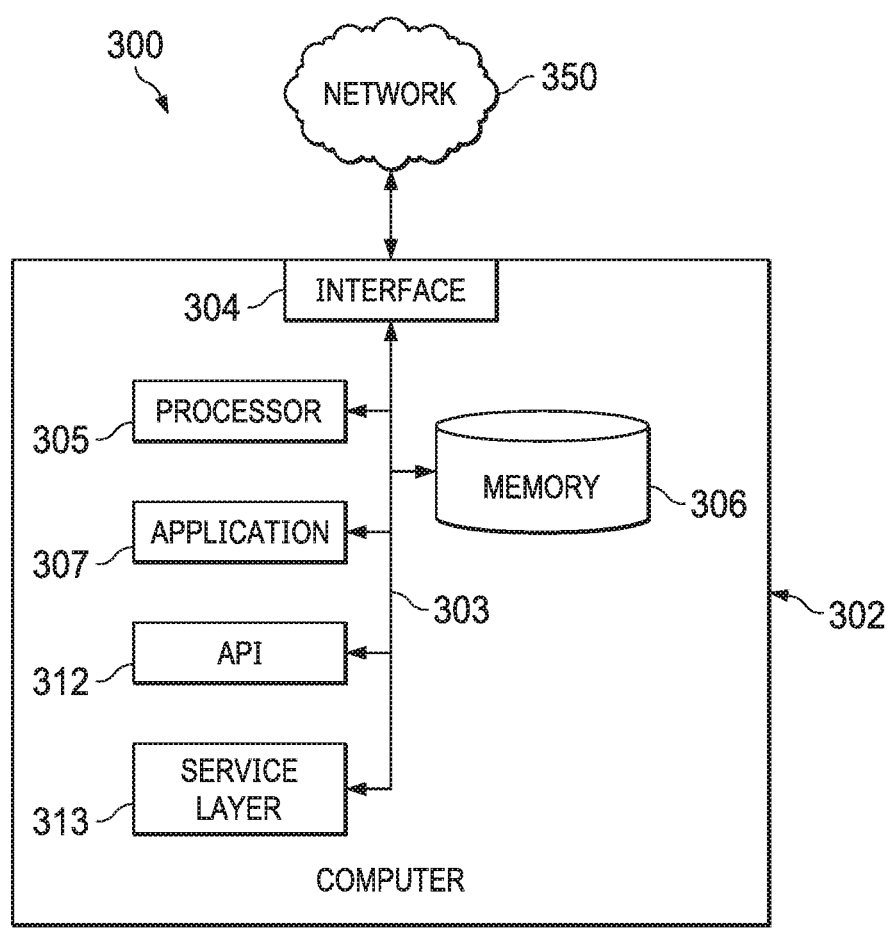
FIG. 3 is a high-level architecture block diagram of a computing system, according to an implementation.
Figure 4:
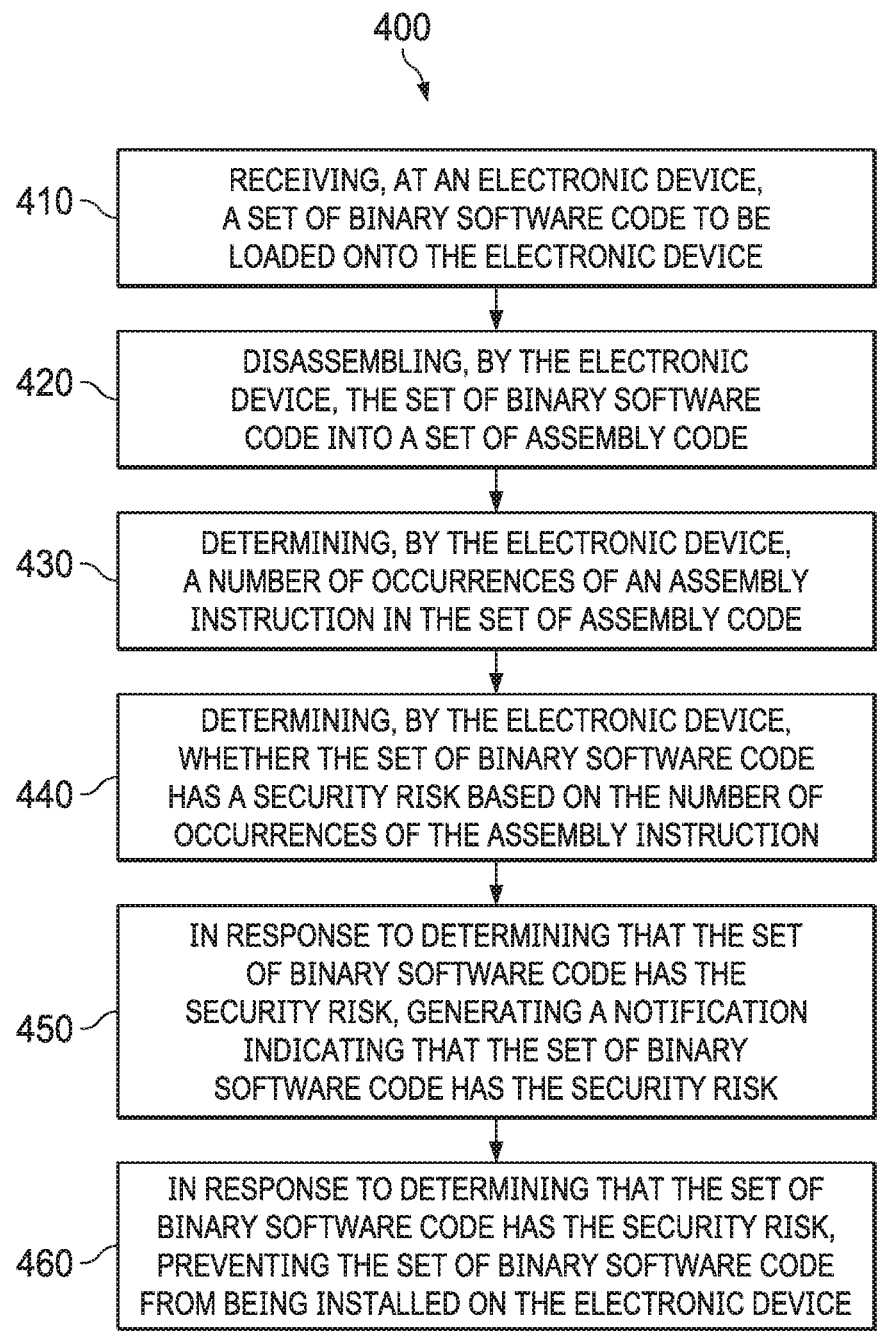
FIG. 4 is a flow diagram showing an example method that detects security risks in binary software code, according to an implementation.

The security server 120 represents an application, a set of applications, software, software modules, hardware, or any combination thereof that can be configured to manage the security risk detections of binary software code. In some cases, the security server 120 can be part of an enterprise mobility management (EMM) server that manages applications and devices for an enterprise that is associated with the electronic device 102. An EMM server can install, update, and manage the license of enterprise applications. In some cases, the EMM server can be located on the premises of the enterprise, behind a firewall, or a combination thereof. In some cases, the EMM server can be configured to provision an enterprise service in a cloud. In some implementations, the security server can receive, send, and update assembly instructions that are associated with one or more compilers to the electronic device 102, and receive a notification from the electronic device 102 indicating that a set of binary software code has a security risk. FIGS. 2-4 and associated descriptions provide additional details of these implementations.

The electronic device 102 represents an electronic device that receives a set of binary software code and determines whether the set of binary software code has a security risk based on searching results of one or more assembly instructions. FIGS. 2-4 and associated descriptions provide additional details of these implementations.

The example communication system 100 includes the network 110. The network 110 represents an application, set of applications, software, software modules, hardware, or combination thereof, that can be configured to transmit data messages between the entities in the system 100. The network 110 can include a wireless network, a wireline network, the Internet, or a combination thereof. For example, the network 110 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, the fifth generation (5G), or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

FIG. 2 is a schematic diagram 200 showing an example electronic device 102 that detects security risks in binary software code, according to an implementation. The electronic device 102 includes a processing unit 262, a communication subsystem 266, a user interface 268, and memory 264. The electronic device 102 may include additional, different, or fewer features, as appropriate.

The example processing unit 262 can include one or more processing components (alternatively referred to as "processors" or "central processing units" (CPUs)) configured to execute instructions related to one or more of the processes, steps, or actions described above, in connection with one or more of the implementations disclosed herein. In some implementations, the processing unit 262 can be configured to generate control information, such as a measurement report, or respond to received information, such as control information from a network node. The processing unit 262 can also include other auxiliary components, such as random access memory (RAM) and read-only memory (ROM).

The example communication subsystem 266 can be configured to provide wireless or wireline communication for data or control information provided by the processing unit 262. The communication subsystem 266 can include, for example, one or more antennas, a receiver, a transmitter, a local oscillator, a mixer, and a digital signal processing (DSP) unit. In some implementations, the communication subsystem 266 can support multiple input multiple output (MIMO) transmissions. In some implementations, the receivers in the communication subsystem 266 can be an advanced receiver or a baseline receiver. Two receivers can be implemented with identical, similar, or different receiver processing algorithms.

The example user interface 268 can include, for example, any of the following: one or more of a display or touch screen display (for example, a liquid crystal display (LCD), a light emitting diode (LED), an organic light emitting diode (OLED), or a micro-electromechanical system (MEMS) display), a keyboard or keypad, a trackball, a speaker, or a microphone. In some cases, the user interface 268 can be used to output notifications indicating that a set of binary software code has a security risk, and receive user input on whether to install the set of binary software code that has a security risk. FIG. 4 and associated descriptions provide additional details of these implementations. The user interface 268 can also include I/O interface, for example, a universal serial bus (USB) interface.

The example memory 264 can be a computer-readable storage medium on the electronic device 102. Examples of the memory 264 include volatile and non-volatile memory, magnetic media, optical media, random access memory (RAM), read-only memory (ROM), removable media, and others. The memory 264 can store an operating system (OS) of the electronic device 102 and various other computer-executable software programs for performing one or more of the processes, steps, or actions described above.

The memory 264 can store applications, data, operation system, and extensions for the electronic device 102. As illustrated, the memory 264 stores a software security analyzer 220. The software security analyzer 220 represents software that is configured to disassemble a set of binary software code into a set of assembly code, search for one or more assembly instructions in the set of assembly code, and determine whether the set of binary software code has a security risk. FIG. 4 and associated descriptions provide additional details of these implementations. The software security analyzer 220 can be a component or an extension of the operating system of the electronic device 102. The software security analyzer 220 can also be an application software installed on the electronic device 102.

The memory 264 includes one or more memory spaces 210 for executable software. The executable software can include operation system software or application software that can be executed on the electronic device 102. If the software security analyzer 220 determines that the set of binary software code has a security risk, the software security analyzer 220 can prevent the set of binary software code from being transferred into the memory spaces 210. In some cases, the software security analyzer 220 can be stored in one of the memory spaces 210 for executable software.

Turning to a general description, the electronic device 102 may include, without limitation, any of the following: endpoint, computing device, mobile device, mobile electronic device, user device, mobile station, subscriber station, portable electronic device, mobile communications device, wireless modem, wireless terminal, or other electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, vehicle, or other mobile communications devices having components for communicating voice or data via a wireless communication network. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used interchangeably herein.

While elements of FIG. 2 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

FIG. 3 is a high-level architecture block diagram showing a computer 302 coupled with a network 350, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 350 facilitates communications between the computer 302 and other devices. In some cases, a user, e.g., an administrator, can access the computer 302 from a remote network. In these or other cases, the network 350 can be a wireless or a wireline network. In some cases, a user can access the computer 302 locally. In these or other cases, the network 350 can also be a memory pipe, a hardware connection, or any internal or external communication paths between the components.

The computer 302 includes a computing system configured to perform the algorithm described in this disclosure. For example, the computer 302 can be used to implement the security server 120 shown in FIG. 1. In some cases, the algorithm can be implemented in an executable computing code, e.g., C/C++ executable code. Alternatively, or in combination, the algorithm can be implemented in an application program, e.g., EXCEL. In some cases, the computer 302 can include a standalone LINUX system that runs batch applications. In some cases, the computer 302 can include mobile or personal computers that run the application program.

The computer 302 may include an input device, such as a keypad, keyboard, touch screen, microphone, speech recognition device, or another device that can accept user information, and/or an output device that conveys information associated with the operation of the computer 302, including digital data, visual and/or audio information, or a GUI.

The computer 302 can serve as a client, network component, a server, a database or other persistency, or the like. In some implementations, one or more components of the computer 302 may be configured to operate within a cloud-computing-based environment.

At a high level, the computer 302 is an electronic computing device operable to receive, transmit, process, store, or manage data and information. According to some implementations, the computer 302 may also include or be communicably coupled with an application server, e-mail server, web server, caching server, streaming data server, business intelligence (BI) server, and/or other server.

The computer 302 can receive requests over network 350 from a client application (e.g., executing on a user device) and respond to the received requests by processing said requests in an appropriate software application. In addition, requests may also be sent to the computer 302 from internal users (e.g., from a command console or by another appropriate access method), external or third parties, other automated applications, as well as any other appropriate entities, individuals, systems, or computers.

Each of the components of the computer 302 can communicate using a system bus 303. In some implementations, any and/or all the components of the computer 302, both hardware and/or software, may interface with each other and/or the interface 304 over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the computer 302. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or other suitable format. While illustrated as an integrated component of the computer 302, alternative implementations may illustrate the API 312 and/or the service layer 313 as stand-alone components in relation to other components of the computer 302. Moreover, any or all parts of the API 312 and/or the service layer 313 may be implemented as child or sub-modules of another software module or hardware module, without departing from the scope of this disclosure.

The computer 302 includes an interface 304. Although illustrated as a single interface 304 in FIG. 3, two or more interfaces 304 may be used according to particular needs, configurations, or particular implementations of the computer 302. The interface 304 is used by the computer 302 for communicating with other systems in a distributed environment connected to the network 350—(whether illustrated or not). Generally, the interface 304 comprises logic encoded in software and/or hardware in a suitable combination and operable to communicate with the network 350. More specifically, the interface 304 may comprise software supporting one or more communication protocols associated with communications such that the network 350 or interface's hardware are operable to communicate physical signals.

The computer 302 includes a processor 305. Although illustrated as a single processor 305 in FIG. 3, two or more processors may be used according to particular needs, configurations, or particular implementations of the computer 302. Generally, the processor 305 executes instructions and manipulates data to perform the operations of the computer 302. In some cases, the processor 305 can include a data processing apparatus.

The computer 302 also includes a memory 306 that holds data for the computer 302. Although illustrated as a single memory 306 in FIG. 3, two or more memories may be used according to particular needs, configurations, or particular implementations of the computer 302. While memory 306 is illustrated as an integral component of the computer 302, in alternative implementations, memory 306 can be external to the computer 302.

The application 307 comprises an algorithmic software engine providing functionality according to particular needs, configurations, or particular implementations of the computer 302. Although illustrated as a single application 307, the application 307 may be implemented as multiple applications 307 on the computer 302. In addition, although illustrated as integral to the computer 302, in alternative implementations, the application 307 can be external to the computer 302.

There may be any number of computers 302 associated with, or external to, the system 300 and communicating over network 350. Further, the terms "client," "user," and other appropriate terminology may be used interchangeably, as appropriate, without departing from the scope of this disclosure. Moreover, this disclosure contemplates that many users may use one computer 302, or that one user may use multiple computers 302.

FIG. 4 is a flow diagram showing an example method 400 that detects security risks in binary software code, according to an implementation. The method 400 can be implemented by an electronic device, e.g., the electronic device 102 shown in FIG. 1. The method 400 shown can also be implemented using additional, fewer, or different entities. Furthermore, the method 400 can be implemented using additional, fewer, or different operations, which can be performed in the order shown or in a different order.

The example method 400 begins at 410, where a set of binary software code is received at the electronic device. The set of binary software code can be the binary software code of an application software, a system software (e.g., an operating system or a device driver), or a component thereof. In some cases, the set of binary software code can be downloaded to the electronic device over a network. Alternatively or in combination, the set of binary software code can be transferred to the electronic device locally, e.g., from a Universal Serial Bus (USB) drive.

At 420, the set of binary software code is disassembled. In some cases, whether the set of binary software code is disassembled for analysis of security risks can be configured. For example, the electronic device can be configured to disassemble and analyze the set of binary software code based on one of more characteristics of the set of binary software code. Examples of the characteristics can include the type (application software or system software) and the source (supplier or developer). Accordingly, the electronic device can determine the characteristics of the set of binary software code, and then determine whether to disassemble and analyze the set of binary software code based on the configurations. The configurations can be set by a manufacturer of the electronic device or the operation system of the electronic device, a security extension or a security application executed on the electronic device, an enterprise administrator of the electronic device, a user of the electronic device, or any combinations thereof.

In one example, the characteristics can include the manner in which the set of binary software code is received. For example, the electronic device can determine if the set of binary software code is received through a sideloading operation. A sideloaded software bypasses the security check procedure of an application store associated with the operating system of the electronic device, and therefore may pose additional security risks. Therefore, if the electronic device determines that the set of binary software code is received through a sideloading operation, the electronic device can determine to initiate the disassembling and the subsequent analyzing procedures of the set of binary software code.

In some cases, if the electronic device determines that the set of binary software code is received through a sideloading operation, the electronic device can generate a notification and send the notification to an EMM server that manages the electronic device. In response, the EMM server can send a command to the electronic device to inform the electronic device whether to proceed with the disassembling step. Alternatively or in combination, a security profile can be installed on the electronic device. The security profile can be sent and updated by the EMM server. The security profile can include policies that indicate whether to analyze security risks of binary software code that are sideloaded. The electronic device can proceed to disassemble the set of binary software code according to the policies in the security profile.

The set of binary software code is disassembled into a set of assembly code. Unlike the source code of a software, assembly code is the low-level code that is specific to the computing architecture of the electronic device. In some cases, the electronic device disassembles the set of binary software code according to metadata of the set of binary software code. Examples of the metadata can include the computing architecture, the compiler that was used to compile the source code version of the set of binary software code, or a combination thereof. In some implementations, some or all of these metadata may be received in the same file as the set of binary software code, e.g., in a header, or in a separate file, e.g., in a manifest. Alternatively or in combination, the electronic device can analyze the set of binary software code to determine these metadata.

At 430, the electronic device determines a number of occurrences of an assembly instruction in the set of assembly code. In some cases, the electronic device can scan the set of assembly code to search for one or more specific assembly instructions. These specific assembly instructions may be associated with security risks. For example, a no-op (NOP) instruction can be used for memory alignment purposes. However, a malicious attacker can also use NOP instruction to patch assembly code to add, remove, or change functionalities of the software. For example, in a NOP slide (or NOP sled, NOP ramp) operation, a malicious attacker can use a sequence of NOP instructions to branches the program to different memory locations. Therefore, the electronic device can search for the NOP instruction in the set of assembly code to determine security risks. The NOP instruction can have different opcode for different computing architectures. For example, in the INTEL x86 computing architecture, the opcode of the NOP instruction can be 0x90. In the ARM A32 computing architecture, the opcode of the NOP instruction can be 0x00000000. Therefore, in some implementations, the electronic device can search the opcode that corresponds to the computing architecture of the electronic device, to find the NOP instructions in the assembly code. In some cases, a list of assembly instructions that are associated with security risks can be stored on the electronic device. In addition to NOP, examples of assembly instructions that are associated with security risks can include routines that are different than routines normally generated by a compiler. Examples of the routines not normally generated by a compiler can include payloads of assembly instructions that do not cause any state changes. These routines may perform operations that undo the state changes by using instructions that change the state back to the original state. In one example, the sequence of instructions can perform a succession of tasks such as "Add one to a register" followed by "subtract one from the register". Hence, in one embodiment of the disclosure, if there is the same number of occurrences of add and sub instructions (such as 100 add instructions and 100 sub instructions) detected, then a security risk can be identified. In some cases, the list can also include one or more assembly instruction sequences that are associated with security risks. Examples of assembly instruction sequences that are associated with security risks can include a sequence for a register to copy the same value onto itself. In some cases, assembly instruction sequences including instructions that make system calls can also be associated with security risks. In some cases, each compiler can generate a set of assembly instructions or assembly instruction sequences. The set of assembly instructions or assembly instruction sequences can be stored on the electronic device. Therefore, as discussed previously, the electronic device can determine the compiler that was used to compile the source code version of the set of binary software code, and search for assembly instructions or assembly instruction sequences that are not included in the stored set of assembly instructions or assembly instruction sequences that correspond to the compiler.

In some implementations, in addition to determining the number of occurrences of the assembly instructions that are associated with security risk, the electronic device can also determine a location of each occurrence of the assembly instructions that are associated with security risks.

At 440, the electronic device determines whether the set of binary software code has a security risk based on the number of occurrences of the assembly instruction. In some cases, a high number of occurrences of the assembly instruction can indicate the presence of a security risk. For example, the NOP instruction is generally used in memory alignment and thus may be used for a limited number of times in a piece of software. In one example, a software application may have two or three NOP instructions in its assembly code. On the other hand, a malicious attacker that uses the NOP instructions to modify the software may use it tens or hundreds of times. Therefore, the electronic device can determine whether the number of occurrences of the NOP instructions in the set of assembly code exceeds a threshold. If the number of occurrences of the NOP instructions is determined to exceed a threshold, the electronic device can determine that the set of binary software code has a security risk.

Alternatively or in combination, whether the set of binary software code has a security risk can be determined based on the location of the assembly instructions that are associated with security risks. For example, in an unaltered software, NOP instructions typically appear at the beginning portion of the software. Therefore, if the electronic device determines that the NOP instructions appear in the middle or later portion of the set of assembly code, the electronic device can determine that the set of binary software code has a security risk.

In some cases, the expected range of number of occurrences of these assembly instructions, the expected locations of these assembly instructions, or a combination thereof, may depend on the compiler that was used to compile the source code version of the set of binary software code. Therefore, as discussed previously, the electronic device can determine the compiler that was used to compile the source code version of the set of binary software code. The electronic device can compare the number of occurrences and the locations of these assembly instructions determined at step 430 with the expected range of number of occurrences and the expected locations associated with the compiler, to determine whether the set of binary software code has a security risk.

In some cases, the expected range of number of occurrences of these assembly instructions, the expected locations of these assembly instructions, or a combination thereof for different compilers can be configured by a manufacturer of the electronic device or an operation system of the electronic device, a security extension or a security application executed on the electronic device, an enterprise administrator or a user of the electronic device, or any combinations thereof. Alternatively or additionally, a security server can send and update the expected range of number of occurrences of these assembly instructions, the expected locations of these assembly instructions, or a combination thereof, for different compilers to the electronic device.

At 450, in response to determining that the set of binary software code has the security risk, the electronic device generates a notification indicating that the set of binary software code has the security risk. In some cases, the notification can indicate any combinations of the name, the number of occurrences, or the locations of the found assembly instructions that have security risks. In some cases, the notification can further indicate the set of binary software code has violated one or more security standards. For example, by including assembly instructions or assembly instruction sequences that are different from the set of assembly instructions or assembly instruction sequences produced by the compiler that was used to compile the source code version of the set of binary software code, the set of binary software code may violate relevant Microprocessor without Interlocked Pipeline Stages (MIPS), Manufacturers Standardization Society (MSS), or International Organization for Standardization (ISO) standards. In some cases, the electronic device can output the notification, send the notification to a security server, or a combination thereof.

At 460, in response to determining that the set of binary software code has the security risk, the electronic device prevents the set of binary software code from being installed on the electronic device. In some cases, the electronic device can refrain from transferring the set of binary software code into an allocated memory space on the electronic device that is used to store executable software, therefore preventing the set of binary software code from being installed. Alternatively or additionally, the electronic device can delete the set of binary software code that has the security risk. In some cases, in response to determining that the set of binary software code has the security risk, the electronic device can output a user prompt on the electronic device, the user prompt can indicate that the set of binary software code has a security risk, and request a user input to indicate whether the set of binary software code can be installed. The electronic device can proceed to install or delete the set of binary software code based on received user input in response.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM), or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media, transitory or non-transitory, suitable for storing computer program instructions and data include all forms of non-volatile memory, media and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to, or represent, the functions of the web browser.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a transitory or non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A computer-implemented method, comprising:
   receiving, at an electronic device, a set of binary software code of an application to be installed on the electronic device;
   determining whether the set of binary software code is received through an application store associated with an operating system of the electronic device; and
   in response to determining that the set of binary software code is not received through the application store associated with the operating system of the electronic device:
      disassembling, by the electronic device, the set of binary software code into a set of assembly code;
      determining, by the electronic device, a number of occurrences of an assembly instruction in the set of assembly code;
      determining, by the electronic device, whether the set of binary software code has a security risk based on the number of occurrences of the assembly instruction; and
      in response to determining that the set of binary software code has the security risk, preventing the application from being installed on the electronic device.

2. The method of claim 1, further comprising:
   determining a location of each occurrence of the assembly instruction in the set of assembly code; and
   wherein whether the set of binary software code has the security risk is determined further based on the determined location.

3. The method of claim 1, wherein the assembly instruction is a no-op (NOP) instruction.

4. The method of claim 1, further comprising:
   in response to determining that the set of binary software code has the security risk, generating a notification indicating that the set of binary software code has the security risk.

5. The method of claim 1, wherein whether the set of binary software code has the security risk is determined further based on a compiler associated with the set of binary software code.

6. A device, comprising:
   at least one hardware processor; and
   one or more computer-readable storage media coupled to the at least one hardware processor and storing programming instructions for execution by the at least one hardware processor, wherein the programming instructions, when executed, cause the at least one hardware processor to perform operations comprising:
      receiving a set of binary software code of an application to be installed on the device;
      determining whether the set of binary software code is received through an application store associated with an operating system of the device; and
      in response to determining that the set of binary software code is not received through the application store associated with the operating system of the device:
         disassembling the set of binary software code into a set of assembly code;
         determining a number of occurrences of an assembly instruction in the set of assembly code;
         determining whether the set of binary software code has a security risk based on the number of occurrences of the assembly instruction; and
         in response to determining that the set of binary software code has the security risk, preventing the application from being installed on the device.

7. The device of claim 6, the operations further comprising:
   determining a location of each occurrence of the assembly instruction in the set of assembly code; and
   wherein whether the set of binary software code has the security risk is determined further based on the determined location.

8. The device of claim 6, wherein the assembly instruction is a no-op (NOP) instruction.

9. The device of claim 6, the operations further comprising:
   in response to determining that the set of binary software code has the security risk, generating a notification indicating that the set of binary software code has the security risk.

10. The device of claim 6, wherein whether the set of binary software code has the security risk is determined further based on a compiler associated with the set of binary software code.

11. One or more non-transitory computer-readable media containing instructions which, when executed, cause a computing device to perform operations comprising:
- receiving a set of binary software code of an application to be installed on the computing device;
- determining whether the set of binary software code is received through an application store associated with an operating system of the computing device; and
- in response to determining that the set of binary software code is not received through the application store associated with the operating system of the computing device:
  - disassembling the set of binary software code into a set of assembly code;
  - determining a number of occurrences of an assembly instruction in the set of assembly code;
  - determining whether the set of binary software code has a security risk based on the number of occurrences of the assembly instruction; and
  - in response to determining that the set of binary software code has the security risk, preventing the application from being installed on the computing device.

12. The one or more non-transitory computer-readable media of claim 11, the operations further comprising:
- determining a location of each occurrence of the assembly instruction in the set of assembly code; and
- wherein whether the set of binary software code has the security risk is determined further based on the determined location.

13. The one or more non-transitory computer-readable media of claim 11, wherein the assembly instruction is a no-op (NOP) instruction.

14. The one or more non-transitory computer-readable media of claim 11, the operations further comprising:
- in response to determining that the set of binary software code has the security risk, generating a notification indicating that the set of binary software code has the security risk.

15. The one or more non-transitory computer-readable media of claim 11, wherein whether the set of binary software code has the security risk is determined further based on a compiler associated with the set of binary software code.

* * * * *